Nov. 19, 1963  A. J. TURANO  3,111,274
COVER FOR PHOTOFLASH GUN ATTACHMENT
Filed June 26, 1957

INVENTOR
ANTHONY J. TURANO
BY *Hubbell and Cohen*
ATTORNEYS.

United States Patent Office 3,111,274
Patented Nov. 19, 1963

3,111,274
COVER FOR PHOTOFLASH GUN ATTACHMENT
Anthony J. Turano, New York, N.Y.
(2 Nassau Blvd., Melverne, Long Island, N.Y.)
Filed June 26, 1957, Ser. No. 668,056
4 Claims. (Cl. 240—1.3)

The present invention relates to a new and improved means for regulating the light illuminating a subject to be photographed. Particularly, the present invention is directed to a new and improved cover means surrounding a photoflash bulb to regulate the illumination of a subject to be photographed by a camera associated with the photoflash bulb.

The problem of taking photographs with insufficient natural illumination has been given extensive examination in the past. The most obvious means for providing adequate lighting is powerful electric lamps directed at the subject. These lamps may be turned on prior to the operation of the camera and thereafter turned off. This technique is normally referred to as studio lighting. Although the results obtained by studio lighting may be excellent, such a technique normally can only be used in professional photographers' studios due to the expense of the lighting apparatus. Moreover, the arrangement of bulbs to achieve proper illumination of the subject to be photographed takes a considerable period of time and therefore can only be used on subject that remain within a limited space as opposed to a moving object. The lighting techniques described herein have primarily been employed in taking professional portraits and the like.

The amateur photographer, however, is also confronted with the problem of taking photographs under insufficient light conditions. The amateur is usually not in a position to incur the large financial burden of studio lighting equipment and normally such equipment is not satisfactory for his usual goals. The amateur photographer often wishes to photograph something on the spur of the moment, such as when a child takes his first steps. Accordingly, the photoflash gun has been developed for the amateur photographer. Essentially, the photoflash gun is a device which synchronizes the energization of a photoflash bulb with the operation of the shutter of a camera. The photoflash bulb is normally designed to give peak light when the shutter is fully opened so as to provide maximum illumination of the subject. Usually, in order to direct the light at the subject, a metallic reflector is placed behind the photoflash bulb in close association therewith so as to reflect light emanating from the bulb in a direction away from the subject back toward the subject. This technique has been employed for a number of years. However, the photographs resulting from this technique are not wholly desirable due to the fact that the light source is substantially a point source. Accordingly, the subject illuminated by the photoflash bulb is either cast in very dark shadows or is brightly illuminated. There are no soft or gray shadows provided as normally results from usual indoor lighting. The resulting photograph therefore has a harsh and unnatural appearance.

Photographers have been aware of this defect in photoflash lighting for some time. Many of them in order to obviate this difficulty have turned around their reflectors so as to prevent any light emanating from the photoflash bulb to be directly cast upon the subject. All light emanating from the bulb either passes rearwardly of the subject or is reflected rearwardly away from the subject and then by single or multiple reflections off the surfaces of the room illuminate the subject with a diffused or soft light. This technique clearly eliminates the deep sharp shadows normally resulting from standard photoflash techniques. However, in view of the fact that the light is so widely diffused and is reflected from so many sources towards the subject, there is almost a total elimination of shadow, which elimination results in a flat photograph, that is a photograph which has little or no depth due to the complete absence of shadows.

Another technique which has been employed to eliminate the deep shadows normally resulting from standard photoflash techniques is one wherein the light source surrounds the lens of the camera. Such an arrangement is successful for eliminating the deep shadows normally present when utilizing photoflash techniques but in effect the result gives a shadowless picture which is objectionable for most types of photography. An example of this type of arangement may be seen in the U.S. Patent No. 2,760,048, granted to C. L. Schulte on August 21, 1956, for "Shadowless Photographic Light." It is interesting to note that the title of the Schulte patent clearly points out that the technique results in the complete elimination of shadows. Although such a technique may be desirable for taking passport photographs and the like, standard indoor amateur photography demands soft shadows for depth and realism.

It is therefore the main object of the present invention to provide a new and improved means for controlling the illumination of a subject by a photoflash bulb in order to provide soft shadows.

Another object of the present invention is the provision of a new and improved cover for a photoflash bulb which controls the emission of light so as to yield a soft shadowed photograph.

A further object of the present invention is the provision of a new and improved cover for a photoflash bulb which permits light to pass out through said cover in a direction toward the subject and in a direction away from the subject.

Still a further object of the present invention is the provision of a new and improved cover for a photoflash bulb which permits light to pass directly out through the cover towards the subject but is arranged to permit a greater amount of light to pass out through the cover away from the subject.

Still another object of the present invention is the provision of a new and improved cover for a photoflash bulb which has one surface adapted to be disposed between the photoflash bulb and the subject to be photographed, and another surface adapted to be disposed on the opposite side of the photoflash bulb, both of said surfaces being translucent to permit light to be passed directly toward the subject and to further permit light to pass rearwardly away from the subject where it is reflected by the room surfaces back towards the subject to provide a soft diffused light which yields soft shadowed photographs.

The above and other objects, characteristics and features of the present invention will be more fully understood from the following description taken in connection with the accompanying illustrative drawing.

Figure 1:
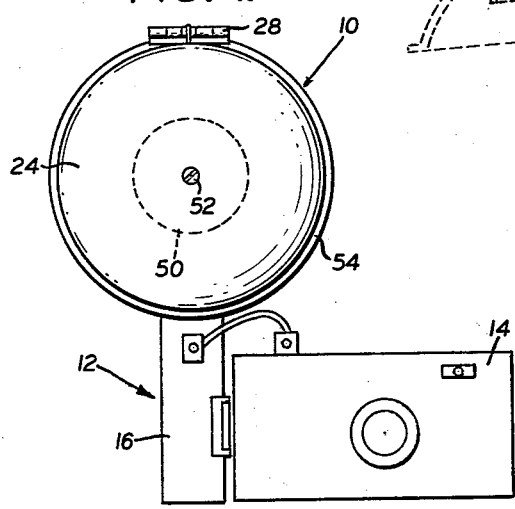
FIG. 1 is a front elevational view of a camera having associated therewith a photoflash gun to which is connected a cover embodying the present invention.

Referring now to the drawing in detail and particularly to FIG. 1 thereof: The cover 10 embodying the present invention is shown therein associated with a photoflash gun 12 which is operatively connected to a camera 14. The photoflash gun is of conventional design having a tubular portion 16 which contains a battery and a solenoid, the upper portion 18 of the tubular member 16 being bent into a horizontal direction and having a bulb socket 20 contained therein. Disposed within the bulb socket 20 is a photoflash bulb 22. The means for synchronizing the energization of bulb 22 with the operation of the shutter of camera 14 forms no part of the present invention. There are a number of possible arrangements. For instance, a shutter lever carried by the camera 14 can be employed to actuate the energization of the bulb 22 mounted in photoflash attachment 12. In lieu thereof a switch on the photoflash attachment 12 can be employed to actuate the energization of the bulb 22 and at the same time be utilized to actuate the shutter of the camera 14. The means for accomplishing the synchronization between the illumination of the bulb 22 and the opening of the shutter of the camera 14 is well known in the art and no description of that is required for an understanding of the present invention.

Figure 2:
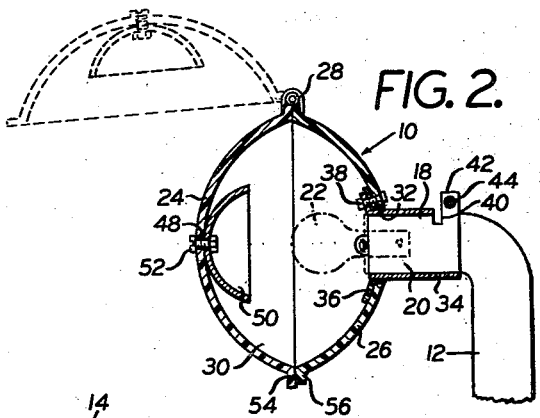
FIG. 2 is a sectional view of the cover shown in FIG. 1.
Figure 3:
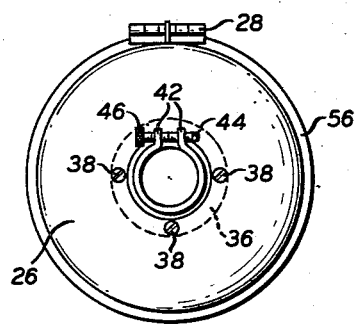
FIG. 3 is a rear elevational view of the cover shown in FIG. 1.

Referring now particularly to FIGS. 2 and 3, cover 10 comprises a front surface 24 and a rear surface 26 which are movably mounted on one another such as by a hinge 28. Surfaces 24 and 26 are preferably surfaces of revolution such as surface portions of spheres. Surfaces 24 and 26 are preferably congruent and are normally in edge-to-edge relationship as shown in solid lines in FIG. 2 whereby to define a chamber 30 in which bulb 22 may be disposed.

Surfaces 24 and 26 are preferably made of a light diffusing material. A translucent material such as, for instance, polyethylene, is eminently suitable. Rear surface 26 is provided with a central aperture 32 through which extends a tubular member 34 having fixed to one end thereof a flange 36. Extending through the portion of surface 26 surrounding aperture 32 and through the flange 36 are a plurality of securing elements such as screws 38 whereby to fix the tubular member 34 relative to rear surface 26. The end of tubular member 34 remote from flange 36 is provided with a transverse slot 40 and a pair of tabs 42 through which a screw 44 having a knurled head 46 threadedly extends. To fix cover 10 on a photoflash attachment 12, the horizontal portion of tubular member 16 is disposed within tubular member 34 which is of larger diameter than tube 16. Thereafter, screw 44 is rotated to move tabs 42 towards one another whereby to clamp tubular member 34 on photoflash attachment 16. Of course, other means for securing cover 10 to photoflash attachment 12 may be employed.

Front surface 24 of cover 10 is substantially identical to rear surface 26 with the exception that surface 24 is provided with a central aperture 48 of much smaller diameter than central aperture 32 on rear surface 26. Disposed within chamber 30 is a reflecting means such as a hemispherical mirror 50 which is fixed relative to front surface 24 as by a nut and bolt arrangement 52 extending through central aperture 48 in front surface 24. Reflecting means 50 is directed toward the rear surface 26 of cover 10. The reason for this will become clear as this description proceeds. To provide for mechanical rigidity, the front and rear surfaces are provided with peripheral beads 54 and 56, respectively, along their respective edges. Preferably, bead 54 on front surface 24 has a portion thereof extending radially outwardly farther than the corresponding portion of bead 56 to provide a convenient means for gripping front surface 24 to move it relative to rear surface 26. As shown herein, the outwardly extending portion of bead 54 is located diametrically opposite to hinge 28. Hinge 28 may be arranged to be connected to portions of the peripheral beads 54 and 56 as by rivets or screws or other securing means. Preferably, hinge 28 is arranged to have a spring means included therein to operate as a toggle. Such hinges are available on the open market. With such a hinge and spring means, the covers 24 and 26 are resiliently held in their normal position shown in solid lines in FIG. 2 and when front surface 24 is moved to the dotted position shown in FIG. 2, hinge 28 holds front surface 24 in said dotted position. With front surface 24 in the dotted position, easy access can be gained to the chamber 30 to change bulb 22 after firing. Moreover, other changes can be performed as will become clear hereinafter.

In operation with cover 10 clamped to photoflash attachment 12 as described above and as shown in FIGS. 2 and 3, and with a photoflash bulb 22 disposed in chamber 30 as shown in FIG. 2, and with surfaces 24 and 26 in edge-to-edge relation as shown in solid lines in FIG. 2, the photoflash attachment is prepared to illuminate a subject with soft shadows. When the camera and photoflash attachment are actuated in any of the conventional manners mentioned above, the shutter of the camera opens and bulb 22 becomes illuminated, the peak of illumination preferably coinciding with the fully opened condition of the shutter. Light will therefore radiate from bulb 22 in all directions. Light directed rearwardly of the camera 14 (that is away from the subject being photographed) will pass out through translucent rear surface 26 which diffuses the light and be reflected off the surrounding surfaces and reflected back by one or several reflections to illuminate the subject with a widely diffused or soft light. Light being directed away from bulb 22 toward surface 24 will pass out of surface 24 which is translucent so as to illuminate the subject with a diffused light of considerable intensity. Some of the light emanating from bulb 22 will impinge on reflector 50 which will reflect the light back toward rear surface 26 where it will exit from the chamber 30. This light will reinforce the light directly passing out through rear surface 26. Accordingly, it will be seen that with the arrangement shown in FIG. 2, all of the light passing out of chamber 30 will be diffused due to the fact that cover 10 is translucent and hence acts to diffuse the light. Moreover, with the inclusion of the rearwardly reflecting means 50 more light will pass out of the rear surface of the cover 10 than within the front surface thereof. The intensity of the light which has passed out of the rear surface 26 will not be as great when it reaches the subject as the intensity of the light passing out of the front surface 24 since the rearwardly directed light will travel a much farther distance and will have gone through one or more reflections. Accordingly, the main illumination will come from the light passing out through the surface 24 and this light will cause shadows since it is emanating substantially from a point source. However, the light passing out through the rear surface will fall upon the subject from many scattered sources and some of it will fall on the shadowed area to lighten those shadows and thus soften the picture. In this manner a soft picture is obtained.

Figure 4:
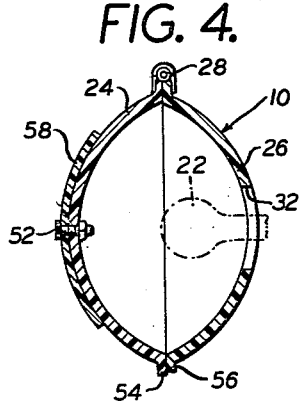
FIG. 4 is a view similar to FIG. 2 showing a modification of the present invention.
Figure 5:
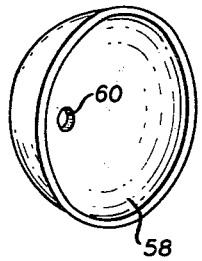
FIG. 5 is a perspective view of an auxiliary cover adapted to be connected to the front surface of the cover shown in FIG. 4 to cut down the light transmission through said front surface.

The same light balancing effect may be obtained with the basic cover shown in FIGS. 1–3 by substituting a second translucent layer for mirror 50. Referring now to FIGS. 4 and 5, a sperical surface portion 58 is brought into overlying surface-to-surface relation with front surface 24 of cover 10. Surface portion 58 is provided with a central aperture 60 which may be brought into registry with aperture 48 on front surface 24. With surface portion 58 and front surface 24 in surface-to-surface relation and the apertures 48 and 60 in registry, the nut and bolt arrangement 52 may again be inserted and connected so as to hold surface portion 58 in the relationship shown in FIG. 4. Surface portion 58 is made of a translucent material such as, for instance, polyethylene, although other translucent materials may be employed. The surface portion 58 effectively makes front surface 24 thicker than rear surface 26. Accordingly, less light will pass out of front surface 24 and surface portion 58 than will pass out of rear surface 26. Therefore, the balance of light emanating from cover 10 will be maintained substantially the same as that resulting from the arrangement shown in FIGS. 1 to 3. Although the arrangement shown in FIG. 4 has been described as being a portion or a variation of the arrangement shown in FIG. 2 in that the basic cover is the same in both and either reflecting means 50 or surface portion 58 are used in the alternative to achieve the light balance described herein, it will be understood that a cover 10 having a surface portion 58 permanently overlying front surface 24 will adequately serve as a photoflash cover embodying my invention.

Figure 6:
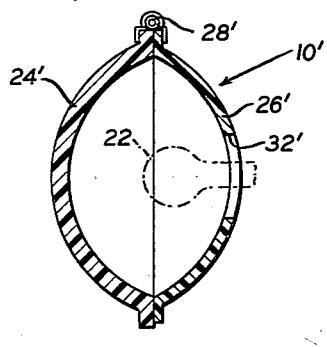
FIG. 6 is a view similar to FIG. 2 showing another modification of the present invention.

Referring now to FIG. 6, another form of the present invention is shown. In this form the cover 10' comprises a rear surface 26' which is made of a relatively thin translucent material such as, for instance, polyethylene. The construction of the rear surface of the means for securing it to the photoflash gun may be substantially identical to that described with regard to FIG. 2. The front surface 24' is a translucent surface of substantially the same surface configuration as surface 24 in FIG. 2. However, front surface 24' in FIG. 6 is substantially thicker than is rear surface 26', whereby to permit more light to pass out of rear surface 26' than out of front surface 24'. The operation of the cover 10' is of course substantially identical to the cover 10 in either of its forms.

Figure 7:
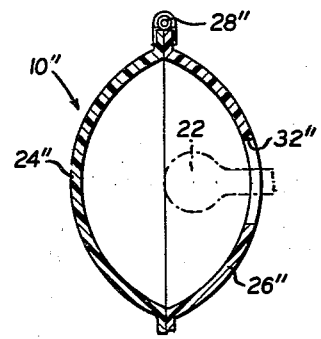
FIG. 7 is a sectional view similar to FIG. 2 showing still another form of the present invention.

Referring now to FIG. 7, a cover 10" embodying still another form of the present invention is shown. In the cover 10" the rear surface 26" and the front surface 24" are substantially identical save for the inclusion of central aperture 22" in rear surface 26" to provide for the mounting of the cover 10" on a photoflash gun. However, front surface 24" is made of a more light absorbing material than is rear surface 26". Preferably, both surfaces are translucent and the only important difference between them is the difference in light transmitting properties. With rear surface 26" being made of a material that transmits more light than front surface 24", more light will pass out of rear surface 26" than out of front surface 24" when bulb 22" is illuminated so as to give the proper balance of light on the subject being photographed.

It will be understood that although the various modifications of the present invention have been described as each singly effecting the desired result of a photoflash bulb cover which is adapted to permit more light to pass out of the rear surface than out of the front surface thereof, several of the means for accomplishing this object may be combined. For instance, a cover may be made having a front surface which is made of a material that does not as readily transmit light as does the rear surface. Moreover, the front surface can be thicker than the rear surface at the same time. Such a cover will embody two of the stated forms of the invention and will yield the desired result. In addition, a relatively thick front surface can be provided with a rearwardly directed reflecting means. Other combinations of the various forms of the present invention may be effected without departing from the present invention.

In addition, it is not necessary that the rear surfaces 26 of the various covers described herein be translucent. In lieu of a translucent material for rear surface 26, 26' or 26", a transparent material may be employed without eliminating the desirable results achieved by the present invention. The main reason for the usefulness of a transparent rear surface is that the light passing out of the rear surface will strike various surrounding objects and wall surfaces where it will become sufficiently diffused to obviate the necessity of prior diffusion by a translucent surface.

Although I have herein shown and described several forms of the present invention and have suggested various changes and modifications, other changes and modifications may be made therein within the scope of the appended claims without departing from the spirit and scope of this invention.

Having now described my invention, what I claim as new and desire to secure by Letters Patent is:

1. In combination with a camera having a lens directed in a predetermined direction, a photoflashgun attachment comprising means supporting a photoflash bulb on said camera in a predetermined position, and a cover enclosing said bulb, said cover having a front surface spaced from said predetermined position in said predetermined direction and a rear surface spaced from said predetermined position in a direction opposite to said predetermined direction, both said front and rear surfaces being made of light transmitting material, means on said front surface for causing more light to be transmitted through said rear surface than through said front surface.

2. In combination with a camera having a lens directed in a predetermined direction, a photoflashgun attachment comprising means supporting a photoflash bulb on said camera in a predetermined position, and a cover enclosing said bulb, said cover having a front surface spaced from said predetermined position in said predetermined direction and a rear surface spaced from said predetermined position in a direction opposite to said predetermined direction, both said front and rear surfaces being made of a translucent material, said front surface being of greater thickness than said rear surface whereby to cause more light to pass out of said rear surface than out of said front surface.

3. In combination with a camera having a lens directed in a predetermined direction, a photoflashgun attachment comprising means supporting a photoflash bulb on said camera in a predetermined position, and a cover enclosing said bulb, said cover having a front surface spaced from said predetermined position in said predetermined direction and a rear surface spaced from said predetermined position in a direction opposite to said predetermined direction, both said front and rear surfaces being made of light transmitting material, and reflecting means disposed between said front surface and said predetermined position, said reflecting means being directed at said rear surface whereby to cause more light to pass out of said rear surface than out of said front surface.

4. In combination with a camera having a lens directed in a predetermined direction, a photoflashgun attachment comprising means supporting a photoflash bulb on said camera in a predetermined position, and a cover enclosing said bulb, said cover having a front surface spaced from said predetermined position in said predetermined direction and a rear surface spaced from said predetermined position in a direction opposite to said predetermined direction, both said front and rear surfaces being made of light transmittting material, said rear surface being made of a material which absorbs less light than does the material out of which said front surface is made, whereby to cause more light to pass out of said rear surface than out of said front surface.

References Cited in the file of this patent

UNITED STATES PATENTS

| | | |
|---|---|---|
| 1,065,094 | Young | June 17, 1913 |
| 1,078,339 | Egan | Nov. 11, 1913 |
| 1,681,151 | Dailey | Aug. 14, 1928 |
| 2,099,767 | Marks | Nov. 23, 1937 |
| 2,129,335 | Poling | Sept. 6, 1938 |
| 2,205,860 | Olds | June 25, 1940 |
| 2,747,076 | Eloranta | May 22, 1956 |
| 2,789,205 | Schwartz | Apr. 16, 1957 |

FOREIGN PATENTS

| | | |
|---|---|---|
| 543,276 | Great Britain | Feb. 17, 1942 |